United States Patent
Grinde

[11] Patent Number: 5,645,003
[45] Date of Patent: Jul. 8, 1997

[54] HULL FOR A HIGH SPEED BOAT

[76] Inventor: Geir Grinde, Parkveien 49, N-0256 Oslo 2, Norway

[21] Appl. No.: 532,706
[22] PCT Filed: Apr. 13, 1993
[86] PCT No.: PCT/NO93/00061
   § 371 Date: Dec. 13, 1995
   § 102(e) Date: Dec. 13, 1995
[87] PCT Pub. No.: WO94/23988
   PCT Pub. Date: Oct. 27, 1994
[51] Int. Cl.[6] .................................................. B63B 39/03
[52] U.S. Cl. .................................. 114/125; 114/271
[58] Field of Search .............................. 114/271, 125, 114/121

[56] References Cited

U.S. PATENT DOCUMENTS

| | | |
|---|---|---|
| 2,757,629 | 8/1956 | Wiltse ................................. 114/125 |
| 3,085,535 | 4/1963 | Hunt . | 
| 3,503,358 | 3/1970 | Moesly ................................ 114/125 |
| 4,528,927 | 7/1985 | Iizuka et al. . |
| 4,538,538 | 9/1985 | Carbonel . |

FOREIGN PATENT DOCUMENTS

| | | |
|---|---|---|
| A1 0244368 | 11/1987 | European Pat. Off. . |
| 303849 | 4/1917 | Germany ........................... 114/125 |
| WO 93/04910 | 3/1993 | WIPO . |

Primary Examiner—Edwin L. Swinehart
Attorney, Agent, or Firm—Clifford W. Browning; Woodard, Emhardt, Naughton Moriarty & McNett

[57] ABSTRACT

Hull for a high speed boat, comprising a V-shaped hull bottom and channels extending in the longitudinal direction of the hull, arranged below the waterline of the hull and adapted for ballasting with water, comprising two channels (1, 2) being arranged near the hull bottom, as structural parts of the hull below the waterline of the hull, symmetrically to the centre axis of the boat, the front portions of the channels (1, 2) being connected with air apertures (4) arranged above the waterline, the channels (1, 2) comprising substantially open outlets (3) below the waterline in the stern of the boat, such that the channels are completely or partly filled with water when the boat is stationary or moved slowly, however, filled with air when the hull planes.

4 Claims, 2 Drawing Sheets

HULL FOR A HIGH SPEED BOAT

The present invention is related to a hull for a high speed boat, comprising a V-shaped floor and channels extending in the longitudinal direction of the hull, adapted to be ballasted with water.

BACKGROUND OF THE INVENTION

Designs of the above mentioned type are used with purpose to provide such boats with better seaworthiness when the hull is not moving and moving by low speed.

There is a great need for such boats being able to move very fast, being economical as to fuel consumption and furthermore being sea stable. Continuously research and development is going on based on different principles for hull designs, with the purpose of achieving an optimal combination of the above mentioned qualities.

Vessels comprising more than one hull, such as catamaran and trimaran, have great stablilty, but have a hard time running in waves, comprise an expensive structure and also have hulls which are difficult to utilize for many practical purposes.

Hulls having deep V-shaped hull bottoms have good seas properties in the planning condition, but when laying still running at low speed, they have poor stability against heeling,. they easily are influenced by the seaway giving heaving and uneasy movements, and they also have large drift when influenced by wind.

These disadvantags very often are compensated or at least compensation has been tried, by arranging a keel to avoid drifting and to arrange ballast to increase the stability and calmer movements. These means do not correspond with the principles behind a planning hull which as such are light and provide little resistance. The result will be a compromise with corresponding properties and poor fuel economy.

There exists several designs in the field of hulls with water ballast. There are open and closed tanks/tunnels, with without complex regulation and operation mechanisms and finally with different positions and volumes in relation to the hull.

NO 16842 describes a hollow keel which may be filled or emptied for water. The hollow space is situated in the centre plane. To make this boat less exposed to capsizing NO 103 822 describes a hull having only one channel which is closed in the bow and open in the aft to reduce the resistance at running speeds as the water is flowing out of the channel. GB 2 219 973 describes a hull comprising several external, rectilinear channels in the shape of pipes. U.S. Pat. No. 2 892 435 describes a hull having to the centre line symmetricly arranged water tanks which can be filled and emptied individually by means of a compressor.

SUMMARY OF THE INVENTION

The present invention provides a hull which is very stable with good weight distribution in the resting position as well as at low speed and which very easily transitions to planning as the change in weight distribution is self-regulating.

To simplify it can be said that the hull according to the present invention comprises the excellent sea properties at high speed from the V-shaped hull bottom, as well as the good stability of the trimaran in the resting position and at low speed, which is further developed as the water ballast as such provides a moment of inertia which cushions rolling and sudden movements in seaway.

The above described advantages are achieved with the hull according to the invention as defined by the features stated in the claims.

BRIEF DESCRIPTION OF THE DRAWING FIGURES

FIG. 1 discloses view in perspective, partly in section, of one embodiment of the invention, the FIGS. 2, 3 and 4 disclose longitudinal sections of the hull in still stand low speed, at the threshold of planning and in the planning condition, FIG. 5 discloses a cross section of the hull in stationery position or low speed, respectively, and FIG. 6 discloses a cross section of the hull in the planning condition.

DESCRIPTION OF THE PREFERRED EMBODIMENTS

Figure 1:
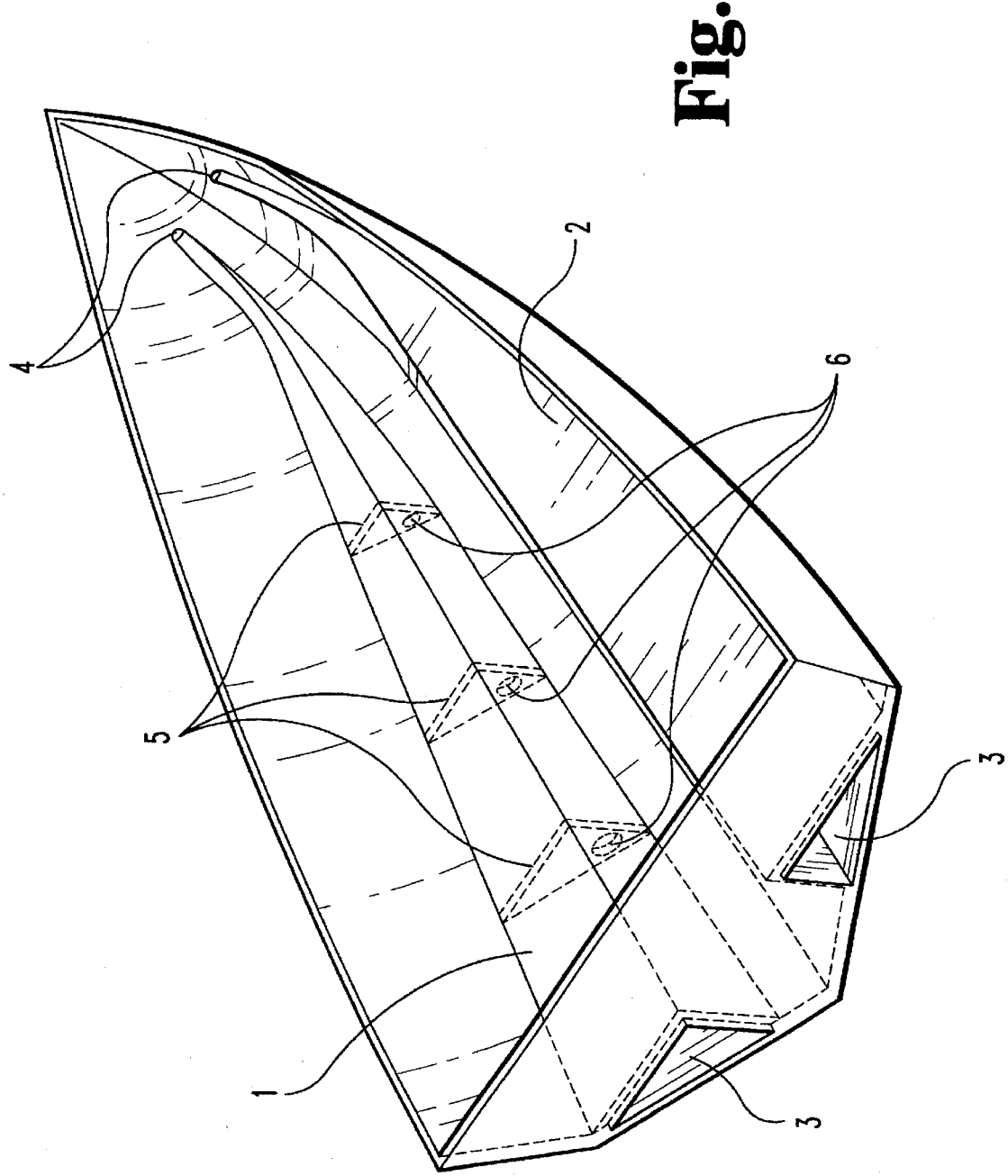
Figure 2:
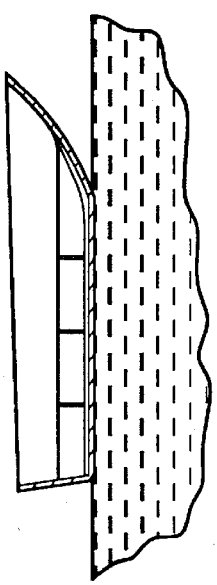

The structure is used in high speed boats, preferably with relatively deep V-shaped hull bottoms. As disclosed in FIG. 1, two channels 1, 2 (partly double floor) are arranged below the water line on each side, parallel to the centre line of the hull. The channels comprise apertures 3 below the water line in the stern of the hull. The front portions of the channels 1, 2 are connected with the surrounding air above the water line, such as by means of air apertures 4 above the water line in the bow. The air apertures 4 may be connected to one which then is connected with both channels. The air apertures 4 may be arranged in the deck or in the ship's side.

By means of the air apertures 4 air may be guided or pressed out of each channel 1, 2 when these are filled with water, when air is guided to the channels 1, 2 then water is pressed out, such as when the hull is lifted up to the planning position.

When stationary or at low speed the channels will be ballasted, e.g. They are filled with water. When the vessel is moved, the channels will remain waterfilled until speed is achieved when The stern apertures are lifted above the water surface and the water therefore increasingly will flow out of the channels 1, 2 through the apertures 3.

Limitations to the flow in the channels 1, 2 may be arranged, such as by transversal bulkheads 5 comprising apertures 6 for Through-flowing of water. Preferably the apertures 6 may have different sizes, depending on the position of the bulkheads in the longitudinal direction of the hull.

Figure 3:
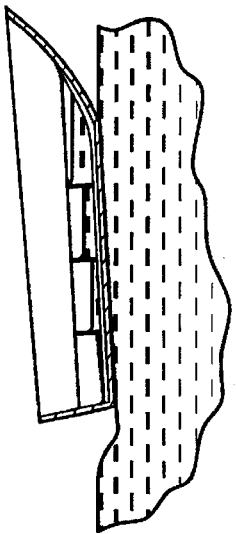
Figure 4:
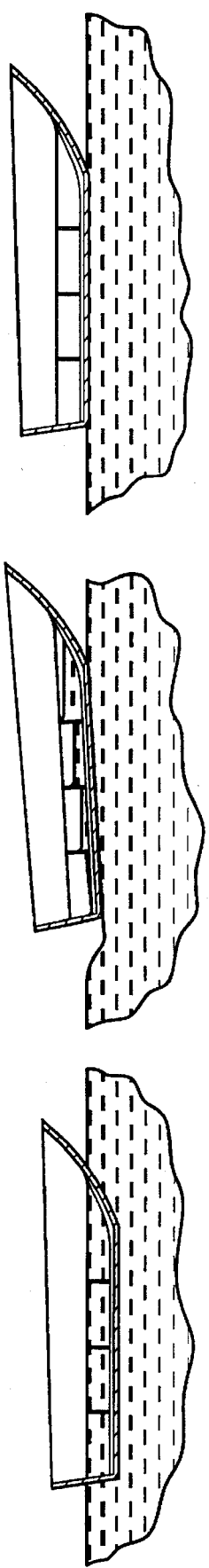
Figure 5:
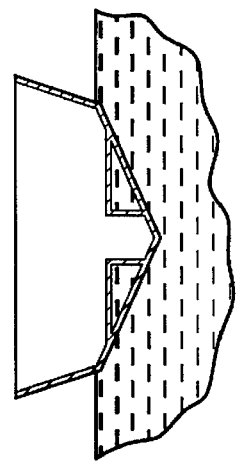
Figure 6:
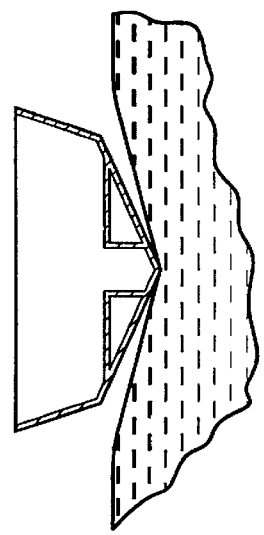

The transversal bulkheads 5 will ensure that the water is emptied most quickly out of the stern portions of the channels such that weight of the water in the front portion of the channels contribute to keep the bow down during The period in which the boat is working itself up to a planning position, see FIGS. 3 and 4. In the planning condition the channels will be empty, see FIG. 5, and therefore will have no influence on the properties of the hull.

When the speed is decreased, the channels again will be filled with water, starting in the stern portion. Hereby the tendency is avoided for quick filling of the channels with the result that the bow would be pressed too deeply down. The air apertures of the channels in the bow ensures a constant emptying or filling of the channels without problems connected with the vacuum or air pockets.

Due to the movement of inertia of the water, the water captured in the channels will contribute to dampen the movements due to the sea movements and due to the low positioning on both sides of the centre line, the water inertia is will provide good. stability to the hull at low or no speed.

I claim:
1. A hull for a high speed motorboat, comprising:
    a substantially V-shaped hull bottom for a high speed motorboat symmetrically formed about a longitudinal center axis from the bow to the stern of said hull bottom;

a pair of enclosed channels within said hull bottom extending substantially from the bow to the stern of said hull bottom and disposed symmetrically about and apart from said longitudinal center axis, with the bow ends of said enclosed channels open to the atmosphere above the water line of said hull bottom, and with substantially all of the remaining portions of said enclosed channels disposed below the water line of said hull bottom, and with the stern ends of said enclosed channels permanently open below the water line of said hull bottom, and with each of said enclosed channels being formed utilizing said hull bottom as one of the enclosing walls thereof.

2. The hull for a high speed motorboat of claim 1 and further including means to regulate the rate of flow of water within said enclosed channels.

3. The hull for a high speed motorboat of claim 2 wherein said means to regulate the rate of flow includes at least one transverse bulkhead disposed within each of said enclosed channels, each bulkhead having at least one aperture sized to permit a predetermined rate of flow of water therethrough.

4. The hull for a high speed motorboat of claim 3 wherein there are a plurality of said transverse bulkheads and the apertures within said bulkheads are varyingly sized according to the disposition of said bulkheads along said longitudinal center axis of said hull bottom with relatively smaller apertures in said bulkheads near the bow of said hull bottom and with relatively larger apertures in said bulkheads near the stern of said hull.

* * * * *

UNITED STATES PATENT AND TRADEMARK OFFICE
CERTIFICATE OF CORRECTION

PATENT NO. : 5,645,003

DATED : July 8, 1997

INVENTOR(S) : Geir Grinde

It is certified that error appears in the above-identified patent and that said Letters Patent is hereby corrected as shown below:

In column 2, line 3, after the word "discloses" please insert --a--.

In column 2, line 32, please delete "The" and insert in lieu thereof --the--.

In column 2, line 37, please delete "Through-flowing" and insert in lieu thereof --through-flowing".

In column 2, line 44, please delete "The" and insert in lieu thereof --the--.

In column 2, line 57, please delete "movement" and insert in lieu thereof --moment--.

Signed and Sealed this

Seventh Day of October, 1997

Attest:

Attesting Officer

BRUCE LEHMAN

Commissioner of Patents and Trademarks